No. 729,841. PATENTED JUNE 2, 1903.
J. J. CAHILL.
MERCHANDISE WEIGHING DELIVERY WAGON.
APPLICATION FILED AUG. 18, 1902.
NO MODEL.
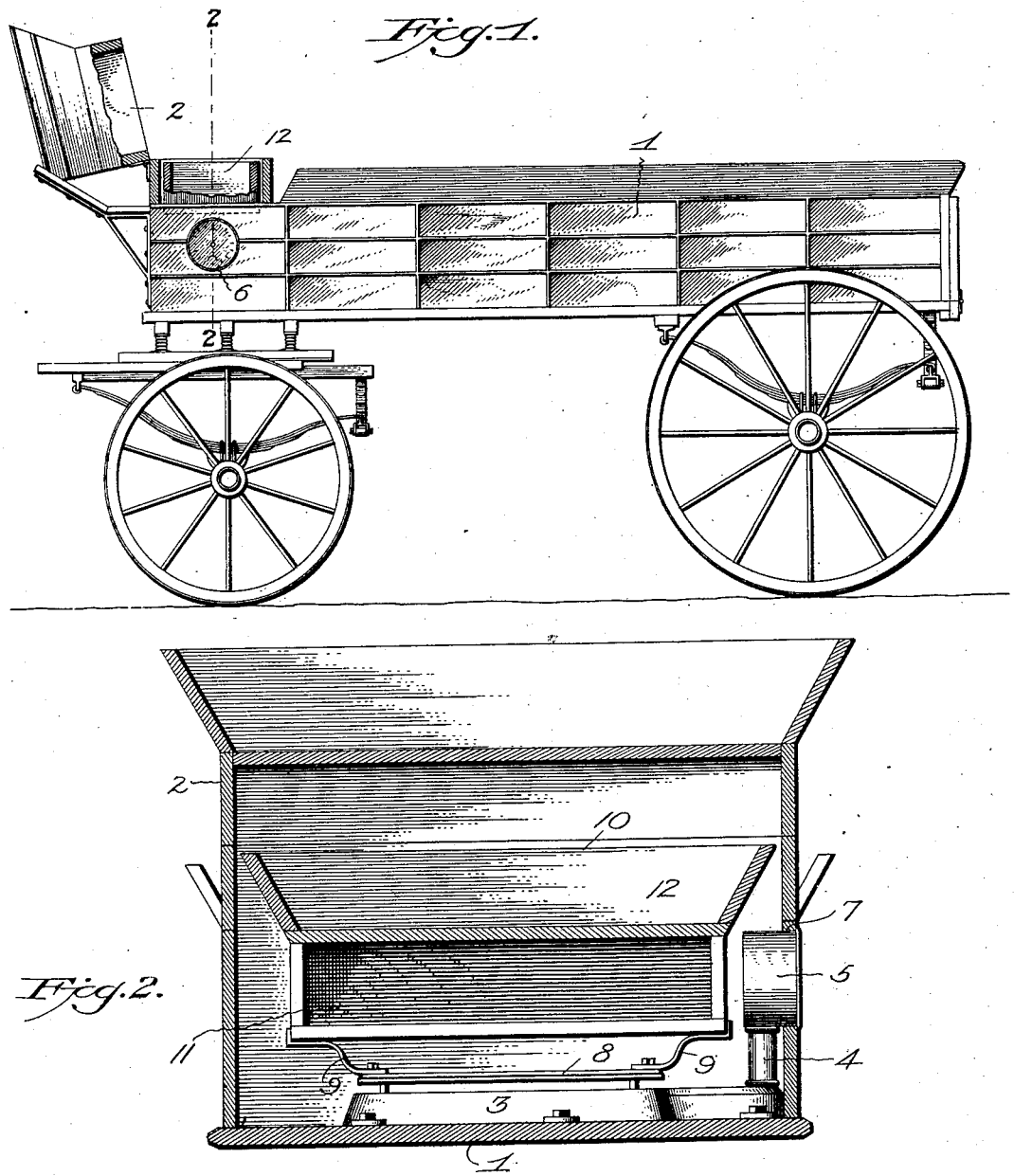

No. 729,841. Patented June 2, 1903.

UNITED STATES PATENT OFFICE.

JAMES J. CAHILL, OF DENVER, COLORADO.

MERCHANDISE-WEIGHING DELIVERY-WAGON.

SPECIFICATION forming part of Letters Patent No. 729,841, dated June 2, 1903.

Application filed August 18, 1902. Serial No. 120,076. (No model.)

*To all whom it may concern:*

Be it known that I, JAMES J. CAHILL, a citizen of the United States of America, residing at Denver, in the county of Arapahoe and State of Colorado, have invented certain new and useful Improvements in Merchandise-Weighing Wagons; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in merchandise-weighing delivery-wagons.

The object of the invention is to equip a wagon with scales suitable for weighing small parcels or merchandise in large quantities. To this end I provide a delivery-wagon with either an ordinary spring-balance or platform scale, which is located beneath the seat thereof or at any suitable point and to which is attached a suitable receptacle for receiving the bundles of merchandise to be weighed, the dial or its equivalent being located on one side of the wagon, so that the weight of the article may be ascertained at a glance. By this arrangement the retail purchaser may ascertain the exact weight of all articles delivered and be thus protected against unscrupulous merchants.

The construction and arrangement of my invention will be fully set forth in the accompanying specification and claims.

In the accompanying drawings, Figure 1 is a side elevation, partly in section, of a delivery-wagon equipped with a parcel-weighing scale beneath the seat thereof. Fig. 2 is a sectional view thereof, taken on the line 2 2 of Fig. 1.

Referring to the accompanying drawings, the numeral 1 indicates the body of the wagon, which may be of any preferred style or design, and 2 is the seat, which in the retail delivery-wagons is hinged to the body at its forward side, so as to be tipped over against the foot-board, as illustrated in Fig. 1. Immediately beneath the seat and secured to the floor of the wagon is a scale 3, preferably of the "spring-balance" type in retail delivery-wagons, and as this scale is of a form in general use and well known any description of its mechanism is deemed unnecessary. The scale is provided with the usual column 4, at the upper end of which is secured the casing 5, in the front side of which is the dial 6. One side of the wagon is provided with a circular opening 7, through which that side of the casing having the dial projects. Thus the dial is visible from the outside of the wagon, while the scale is concealed. To each end of the scale-platform 8 is secured a support or bracket 9, and upon these supports rests the parcel-receiver 10. This receiver comprises a lower compartment 11 and an upper compartment 12, the upper compartment being in the form of a tray, as clearly shown in Fig. 2, while the lower compartment is in the form of a box which is open at its rear side. When an article of small bulk is to be weighed, it is placed in the lower compartment 11 and its weight ascertained by glancing at the dial 6; but when an article of considerable bulk is to be weighed the seat 2 is tipped forward and the said article is placed in the upper compartment 12. By this arrangement I provide a very convenient means for weighing articles of varying bulk and such as are not very heavy, and a wagon thus arranged is especially adapted for retail delivery service.

From the foregoing it will be seen that my invention is simple, practical, and applicable to wagons of all designs.

Having fully described the invention, what I claim as new, and desire to secure by Letters Patent, is—

1. The combination with a wagon having the seat hinged thereto, of scale mechanism located at the bottom of said wagon beneath the seat, a platform, comprising an upper and lower compartment which rests upon the scale mechanism, and means, located at the side of the wagon for ascertaining the weight of the article placed upon the platform, substantially as shown.

2. The combination with a wagon having the seat hinged thereto, of scale mechanism secured to the bottom of the wagon, beneath the seat; a platform which rests upon the scale mechanism, comprising an upper and lower compartment, the upper compartment being accessible from above, while the lower compartment is accessible from the rear, and a dial located at the side of the wagon, for ascertaining the weight of the article placed upon the platform, substantially as shown.

3. The combination with a wagon having the seat hinged thereto at its front side of scale mechanism located beneath the said seat and secured to the bottom of the wagon; a platform which rests upon the scale mechanism, comprising an upper compartment, which is open at the top, and a lower compartment which is open at the rear; and a dial located at the side of the wagon, for ascertaining the weight of the article placed upon the platform, substantially as shown.

4. The combination with a wagon having a seat hinged thereto at its front side, of scale mechanism secured to the bottom of the wagon, beneath the seat, and brackets which are secured to the scale mechanism, a removable platform which rests upon the brackets, comprising an upper compartment which is open at the top and a lower compartment which is open at the rear, and a dial located at the side of the wagon, and connected with the scale mechanism for ascertaining the weight of an article placed upon the platform, substantially as shown.

In testimony whereof I affix my signature in presence of two witnesses.

JAMES J. CAHILL.

Witnesses:
G. SARGENT ELLIOTT,
GRACE P. LINDSLEY.